United States Patent [19]

Khare et al.

[11] Patent Number: 4,599,502

[45] Date of Patent: Jul. 8, 1986

[54] INDUCTION HARDENING OF STEEL

[75] Inventors: Ashok Khare; Paul Duliba, both of Warren, Pa.

[73] Assignee: National Forge Company, Irvine, Pa.

[21] Appl. No.: 554,460

[22] Filed: Nov. 22, 1983

[51] Int. Cl.$^4$ .............................................. H05B 6/64
[52] U.S. Cl. .................. 219/8.5; 219/10.41; 219/10.75; 219/10.77; 148/143; 148/144; 148/152
[58] Field of Search ...... 219/7.5, 8.5, 10.57, 219/10.59, 10.41, 10.77, 10.75; 76/107 R; 148/143, 144, 145, 148, 150, 152, 154

[56] References Cited

U.S. PATENT DOCUMENTS

| | | | |
|---|---|---|---|
| 2,364,893 | 12/1914 | Endress | 148/21.55 |
| 3,270,177 | 8/1966 | Prediger et al. | 219/10.75 |
| 3,377,214 | 4/1968 | Woodbridge et al. | 148/16.6 |
| 3,562,030 | 2/1971 | Seulen et al. | 148/131 |
| 3,682,721 | 8/1972 | Seulen et al. | 148/131 |
| 4,142,923 | 3/1979 | Satava | 148/131 |
| 4,388,510 | 6/1983 | Hughes | 219/10.75 X |
| 4,394,194 | 7/1983 | Satava et al. | 148/131 |
| 4,459,451 | 7/1984 | Regele | 219/10.69 X |

FOREIGN PATENT DOCUMENTS 57-39160 3/1982 Japan .
926062 5/1982 U.S.S.R. .

OTHER PUBLICATIONS

Roberts and Cary, *Tool Steels,* American Society for Metals, Metals Park, Ohio 44073, pp. 578–589 (4th edition, 1980).

*Primary Examiner*—Clarence L. Albritton
*Assistant Examiner*—M. M. Lateef
*Attorney, Agent, or Firm*—Wayne M. Kennard

[57] ABSTRACT

A method for induction hardening through hardened chromium-molybdenum hot work die steel comprising the steps of induction heating to a uniform temperature above the upper critical temperature, cooling, and double tempering at temperatures below the lower critical temperature to produce a workpiece having a tough core and a hard wear resistant surface. An apparatus is provided for induction hardening long workpieces with minimum distortion by providing an inductor coil which always remains centered around the workpiece during induction coil traverse. Mandrel bars for tube piercing mills can be induction hardened using this process and apparatus.

17 Claims, 8 Drawing Figures

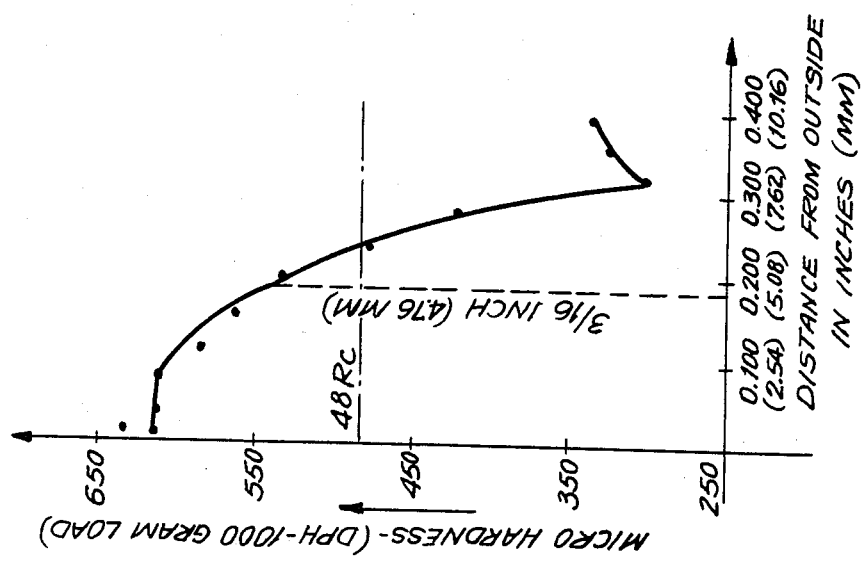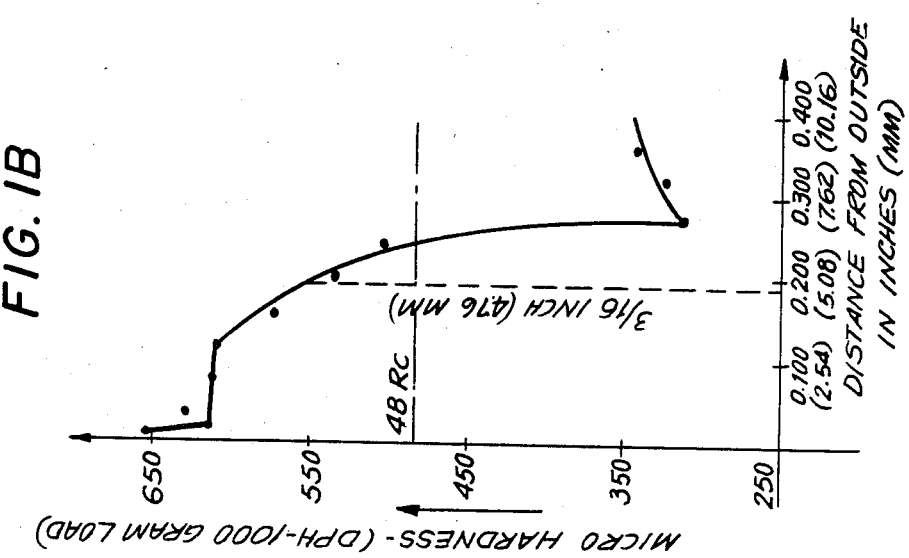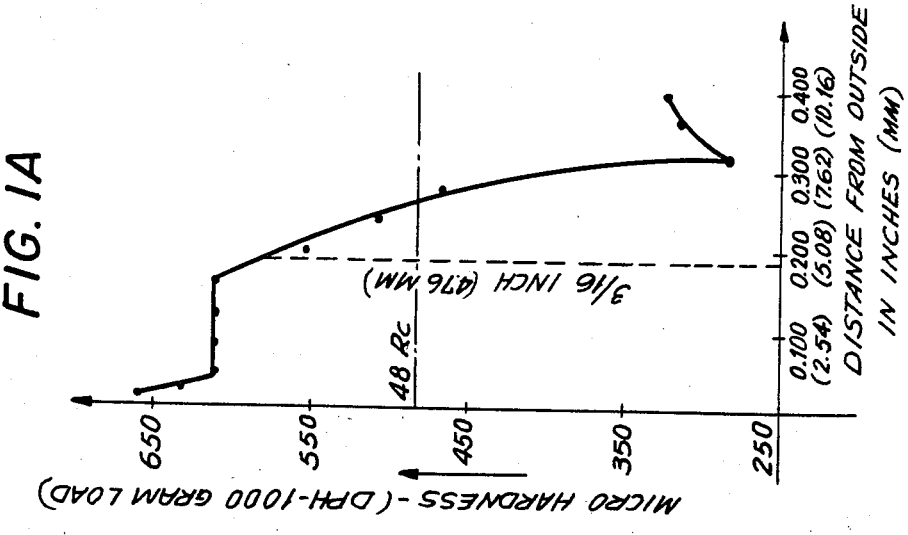

INDUCTION HARDENING OF STEEL

BACKGROUND OF THE INVENTION

This invention relates to a process and apparatus for induction hardening hot work die steels and mandrel bars for tube piercing mills made using that process and apparatus. More particularly, this invention relates to induction hardening of through hardened chromium-molybdenum hot work die steels (Class 520, which includes AISI types H-10, H-11, H-12, and H-13) to achieve a tough center and high case hardness and an apparatus for induction hardening long workpieces with a minimum of distortion.

The steels in Class 520 are the most widely used of all hot work die steels because of their toughness and shock resistance. Typical applications for Class 520 steels are die-casting dies, forging dies, punches, piercers and mandrels for hot work, hot extrusion tooling, shear blades for hot work, and all types of dies for hot work that involves shock. (For a description of the chemistry and physical properties of Class 520 steels, see Roberts and Cary, *Tool Steels*, American Society for Metals, Metals Park, Ohio 44073, at pp. 578-79 (4th edition, 1980).)

Case hardening of products made from chromium-molybdenum hot work die steels, such as mandrel bars for tube piercing mills, generally is accomplished by nitriding or chrome plating. These techniques produce a thin case. With nitriding, for example, the depth of hardness is approximately 0.025 inch (0.635 mm.). Chrome plating produces an even thinner case than nitriding. Such thin cases wear out quickly, thus shortening the life of workpieces case hardened by these techniques. In addition, there is a potential problem of hydrogen embrittlement in chrome plating and a white layer effect in nitriding.

Case hardening by induction heating allows a greater depth of hardness than nitriding or chrome plating. Induction heating is performed by passing an alternating current through a scanning induction coil surrounding the material to be heated. The rapidly alternating electrical field, in which the material to be heated is held, causes the steel to heat very rapidly, due to eddy currents and hysteresis. Depth of hardness is controlled by varying the power level and frequency of the alternating current and travel speed of the inductor coil.

Induction heating has been used to case harden heat treated carbon and low alloy grades of steel which are not through hardening grades. Induction heating has not been used to case harden through hardened high alloy steels such as those in Class 520. This is most likely because one skilled in the art would expect such induction hardening of high alloy steels to result in surface peeling and cracking because of high stresses associated with high alloy steel.

One problem with induction hardening, however, is that it causes distortion in the workpiece as hardening progresses. The tendency to distort increases as the length that has been induction hardened increases. For example, it has been found that there is as much as ¼ inch (6.35 mm.) bow in a workpiece after an inductor coil travel distance of approximately 10 feet (3048 mm.). Because of distortion, the workpiece moves closer to the inductor coil in one direction and farther from the coil in another direction. With the resulting uneven heating, the severity of the distortion quickly multiplies. Therefore, it will be realized that a uniform gap or distance between the workpiece and inductor coil is very important in the prevention of the multiple distortion effect.

In conventional induction hardenening equipment, the scanning inductor coil is fixed so that the inductor coil can move only in a forward or backward direction along the length of the workpiece. Because the usual gap between the inductor coil and workpiece is very small, about 3/16-¼ inch (4.76-6.35 mm.), eventual workpiece distortion has been observed to cause the inductor coil to collide with the workpiece causing arcing and cessation of scanning.

One possible way to lessen the multiple distortion effect and to prevent collisions between the coil and workpiece resulting from distortion is to increase the gap or distance between the inductor coil and the workpiece. However, this is impractical because the bigger the gap, the less efficient the heating process. Another possible way to lessen distortion is to scan in increments, letting one small area harden before proceeding to the next area. However, such interrupted or non-continuous scanning results in "soft spots," i.e., a non-uniform surface hardness and case depth, and possible surface cracking.

Distortion can be corrected after induction hardening by forming the workpiece with an extra material or "stock" above the specified diameter which is machined away where necessary after induction hardening. However, the extra machining step is time consuming and costly, and results in a loss of case depth.

SUMMARY OF THE INVENTION

The present invention solves the problems referred to above. Thus, the present invention provides a method for induction hardening through hardened chromium-molybdenum hot work die steels to achieve a uniform surface hardness and depth of hardness, without any peeling or cracking of the case. The present invention also provides an apparatus for the continuous induction hardening of long workpieces with small cross-sectional areas, such as mandrel bars for tube piercing mills, with minimum distortion.

The process of this invention comprises the steps of induction heating through hardened chromium-molybdenum hot work die steel to a temperature above the upper critical temperature, cooling, and then double tempering at temperatures below the lower critical temperature.

The apparatus of the present invention comprises a "free floating" inductor head which supports an inductor coil for heating a workpiece and adjusts to distortions in the workpiece so that there is always a uniform gap between the inductor coil and the workpiece. The inductor head is supported on the workpiece by guides contacting the workpiece on at least one side of the inductor coil. Since the guide is in contact with the workpiece, any distortion in the workpiece adjusts the inductor head to a position such as to maintain the inductor coil uniformly spaced around the workpiece.

BRIEF DESCRIPTION OF THE DRAWINGS

FIGS. 1 (A-C) are plots of micro-hardness against distance from the outside diameter for steel bar segments of three different diameters induction hardened and tempered by the method and apparatus of the present invention.

DETAILED DESCRIPTION OF THE PREFERRED EMBODIMENT

Figure 3:
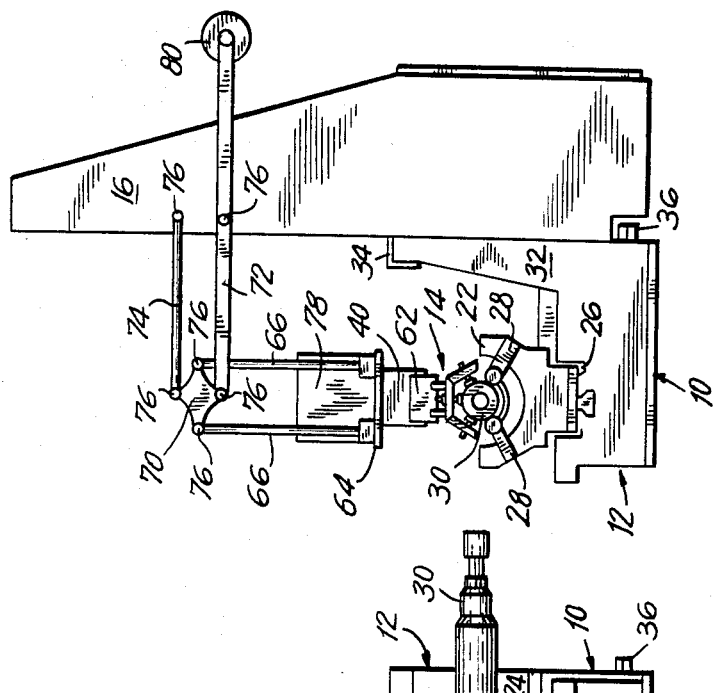
FIG. 3 is a view looking from the right end of FIG. 2.

The present invention is directed to developing surface hardness and case depth of through hardened chromium-molybdenum hot work die steels without peeling or cracking of the case. The present invention also makes it possible to induction harden long workpieces with minimum distortion. As used herein, the term "long workpiece" means any workpiece that, because of its length, thickness, or both, cannot be induction hardened without an acceptable amount of distortion using conventional induction hardening equipment. "Distortion" is any deviation from the desired shape or contour of the workpiece. "Minimum distortion" means no, or at least an acceptable amount of, distortion. The workpiece can be the same length as or longer than the maximum possible length to be induction hardened. The method and apparatus of the present invention can be utilized for hardening mandrel bars for tube piercing mills. The dimensions of a typical mandrel bar of particular interest to the present invention has an approximate overall length of about 35 feet (10,668 mm.), an outside diameter of about 5 to 9 inches (127 to 229 mm.), and a bore of about 2 to 4 inches (51 to 102 mm.).

The preparation of a through hardened chromium-molybdenum hot work die steel workpiece to be induction hardened according to this invention includes hot working from an ingot, post hot working treatment, and through hardening treatment. The workpiece can be through hardened using any thermal-mechanical process. Typical steps and parameters for achieving a through hardened workpiece vary according to the through hardness desired and chemistry of the steel and are described in Roberts and Cary, *Tool Steels*, American Society for Metals, Metals Park, Ohio 44073, at pp. 578-89 (4th edition, 1980). A typical through hardness of H-11 steel, for example, is 321 to 375 Brinell (converted to 34 to 40 Rc) having a yield strength in the range of 128,000–141,250 psi (90.0–99.3 Kg./mm.$^2$), and an impact strength of approximately 10 foot pounds (13.6 Joules).

According to the preferred embodiment of the present invention, through hardened chromium-molybdenum hot work die steel is case hardened without peeling or cracking of the case by induction heating to a uniform surface temperature above the upper critical temperature, cooling, and then double tempering at temperatures below the lower critical temperature. FIGS. 1(A–C) show the properties achieved in workpieces induction hardened, cooled, and double tempered according to Example 1 below.

When induction hardening heat treated carbon and low alloy grades of steel which are not through hardening grades, a liquid quench is used in conjunction with induction heating to obtain a hardened case to the desired depth. A liquid quench also is used to maximize impact properties. However, the induction hardening according to the present invention can be done without a liquid quenching medium, i.e., the steel can be allowed to air cool, to maximize toughness and to minimize distortion.

Even more significant in the minimization of distortion is the free floating head capability of the induction hardening apparatus of the present invention, described in detail below. This capability allows a workpiece to be continuously case hardened with minimum distortion and uniform surface hardness and case depth. There is no multiple distortion effect because the inductor coil position is automatically adjusted as necessary to maintain a uniform gap between the inductor coil and the workpiece. In addition, it is not necessary to form the workpiece with extra thickness or stock for straightening by machining as is sometimes done conventionally. Thus, the diameter of the workpiece can be formed originally to the exact specification, the costly machining step is eliminated, and there is no loss of case depth resulting from machining.

Referring now to FIGS. 2 through 6, a preferred embodiment of the induction hardening apparatus of the present invention will be described. The apparatus generally comprises a frame 10, a stationary bed 12, an inductor head support assembly 14, a carriage assembly 16, and a headstock drive assembly 18. The frame 10 supports the stationary bed 12 which in turn supports steady rests 20, 22, and 24 and the headstock drive assembly 18. Steady rests 20, 22, and 24 fit into track 26 of stationary bed 12. Removable rollers 28 mounted in steady rests 20, 22, and 24 contact and support a workpiece to be induction hardened, such as mandrel bar 30. The headstock drive assembly 18 engages and rotates mandrel bar 30.

The carriage assembly 16 is slidably supported on upright side 32 of stationary bed 12 by carriage ways 34 and bearing ways 36. Because carriage assembly 16 and inductor head support assembly 14 are connected together, as carriage assembly 16 traverses or scans along mandrel bar 30 from right to left in FIG. 2, the inductor head support assembly 14 moves in the same direction.

Inductor head support assembly 14 (shown in detail in FIGS. 4, 5, and 6) comprises inductor head 40, roller guide 42, inductor coil 44, and shoe guide 46. Inductor head 40 supports roller guide 42, inductor coil 44, and shoe guide 46. Inductor coil 44 surrounds and heats the mandrel bar 30 as the bar is rotated by headstock drive assembly 18 and as the carriage assembly 16 makes its traverse. Roller guide 42 (FIG. 5) comprises ball bearing rollers 48, roller adjusting bracket 49, roller mounting bracket 50, connector tabs 52, and inductor head connector plate 54. Shoe guide 46 (FIG. 6) comprises shoes 56, shoe mounting bracket 58, connector tabs 60, and inductor head connector plate 62. Ball bearing rollers 48 and one shoe 56 contact the top of mandrel bar 30 as bar 30 rotates and as the carriage assembly 16 makes its traverse. The inductor head support assembly 14 thereby rests on and is supported by mandrel bar 30.

The carriage assembly 16 and inductor head support assembly 14 are pivotably connected to each other to allow the inductor head support assembly 14 to "free float" in any direction in the plane of the paper in FIG. 3. On top of inductor head 40 sits a rectangular plate 64 having longitudinal arms 66 rigidly mounted one at each corner. The pair of longitudinal arms 66 closer to the headstock drive assembly 18 are pivotably connected to a first connector plate 68 (seen in side view in FIG. 2), while the remaining pair of arms 66 are pivotably connected to a second connector plate 70. One set of transverse arms 72 and 74 are pivotably connected to the carriage assembly 16 and the first connector plate 68 while another set of transverse arms 72 and 74 are pivotably connected to the carriage assembly 16 and the second connector plate 70. There are twelve pivot points 76 (four on each connector plate 68 and 70 and four on carriage assembly 16) connecting the carriage assembly 16 to the inductor head assembly 14 through longitudinal arms 66 and transverse arms 72 and 74 to give the inductor head 40 its free floating capability.

A transformer 78 for supplying power to the inductor coil 44 sits on plate 64. The transformer 78, being quite heavy, also serves to keep the roller and shoe guides 42 and 46 in contact with the mandrel bar 30. A counterweight 80 for making the inductor head 40 float more freely is supported between and by transverse arms 72.

The "free floating" ability enables the inductor coil 44 to adapt to any distortion in the mandrel bar 30 so that the inductor coil 44 is always centered around bar 30 as the inductor coil 44 makes its traverse, driven by the carriage assembly 16.

In the conventional or fixed head configuration, the inductor coil is fixed in relation to the workpiece because the parts analogous to carriage assembly 16 and inductor head support assembly 14 are fixed in relation to one another during scanning, the analogous inductor head support assembly being supported by the analogous carriage assembly and lacking the roller and shoe guides 42 and 46 of the present invention. In addition, there are no pivotal connections during scanning between the analogous conventional carriage assembly and inductor head support assembly. In the fixed head configuration, any slight distortion of the workpiece quickly multiplies because the portion of the workpiece closest to the coil heats more quickly causing greater distortion.

With the free floating head capability, the inductor coil 44 adapts to any distortion of the workpiece. Because the roller and shoe guides 42 and 46 are in contact with the workpiece, any distortion in the workpiece causes guides 42 and 46 to move with that distortion. The adjustment of guides 42 and 46 in turn moves inductor head 40 thus automatically adjusting inductor coil 44 to remain properly centered around the workpiece during the traverse of the inductor coil 44.

Another advantage of the free floating head is that the workpiece is hardened in one continuous traverse of the inductor coil. There is no need to harden the workpiece in increments, a technique which results in soft spots, i.e., a non-uniform hardened surface and case depth.

Figure 2:
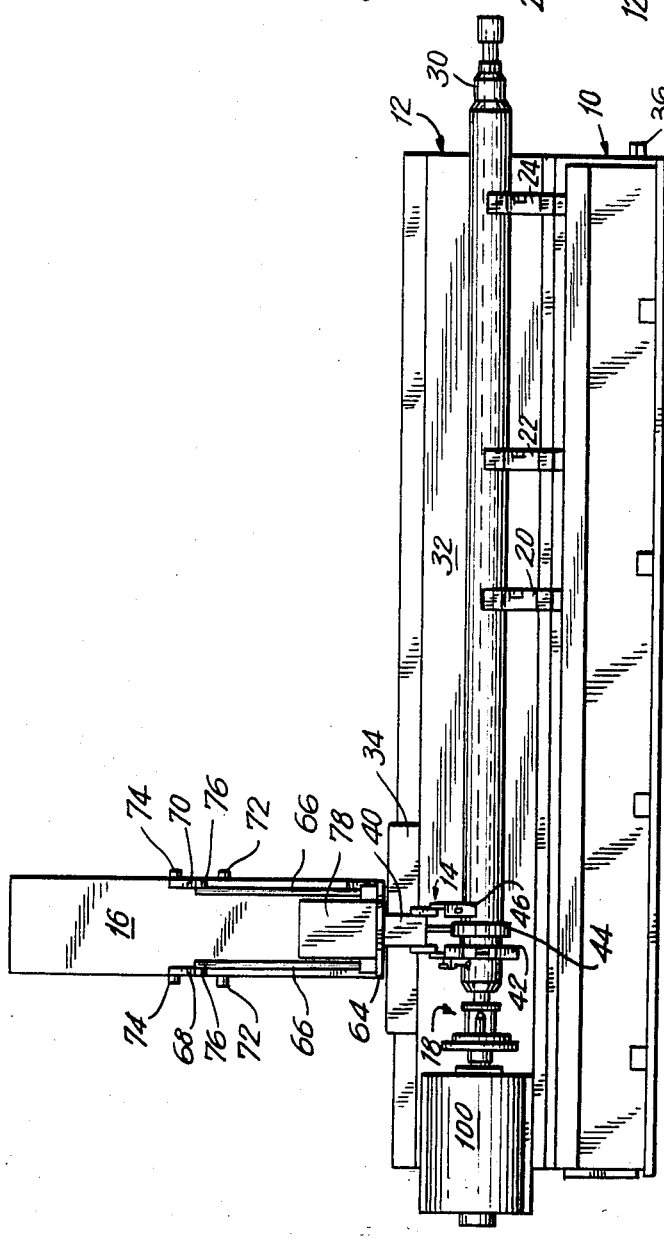
FIG. 2 is an overall side view of the induction hardening apparatus of the present invention.
Figure 6:
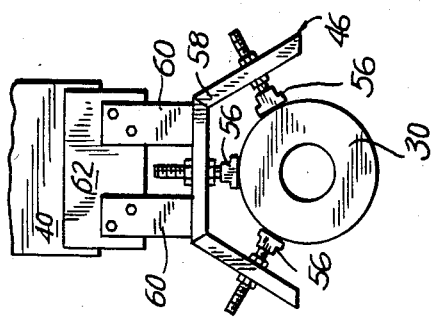
FIG. 6 is an end view of the shoe guide.

As mentioned previously, the direction of inductor coil travel is from right to left in FIG. 2. The ball bearing roller 48 are on the leading or cold side while the shoes 56 are on the trailing or hot side of the mandrel bar 30. One ball bearing roller 48 is electrically isolated from its mounting bracket 50 to prevent arcing, which could damage the ball bearing rollers 48. Generally, only one shoe 56 is touching the mandrel bar 30. The only time that all shoes 56 are on the mandrel bar 30 is when the ball bearing rollers 48 run off beveled end 82 of the bar 30 near the end of the inductor coil 44 traverse. This precaution is used because the induced current in the shoes 56 and shoe mounting bracket 58 will cause inductive heating of the shoe mounting bracket 58 and cause arcing between the shoes 56 and the mandrel bar 30. However, such heating and arcing will be minimal in the short time between when the ball bearing rollers 48 run off the end of bar 30 and the end of the inductor traverse. The inductor coil 44 can run out over the beveled end 82 of the bar 30, if desired.

When steady rests rather than headstock and tailstock centers support the workpiece, it is possible to induction harden a portion of a workpiece that is longer than the maximum travel distance of the inductor coil. The travel distance of the inductor coil 44 is limited only by the length of stationary bed 12. In the preferred embodiment, as seen in FIG. 2, mandrel bar 30 extends past the right end of stationary bed 12. This feature can be used to harden the front portion (left end in FIG. 2) of the mandrel bar 30 and not the rear portion (right end), which does not need hardening due to the fact that the rear end will not contact any hot surface in use in the tube piercing operation. For example, the apparatus of the present invention has been used to induction harden a length of approximately 29 feet, 4 inches (8941 mm.), in the area of inductor coil travel, of a 35 foot (10,668 mm.) mandrel bar.

The steady rests supporting the mandrel bar in the area to be heated, steady rests 20 and 22 in FIG. 2, are equipped with the widest available removable rollers 28 to minimize any indentation while running on the hot surface of the mandrel bar 30. Removable rollers 28 are manually removable to accommodate the inductor coil 44 as it traverses past the steady rests 20 and 22. Rollers 28 are removed only long enough for the inductor coil 44 to pass through and then are reinserted to minimize distortion of the mandrel bar 30.

When induction hardening a shorter workpiece according to the present invention, the workpiece can be supported in the apparatus by headstock and tailstock centers at either end rather than steady rests.

Figure 4:
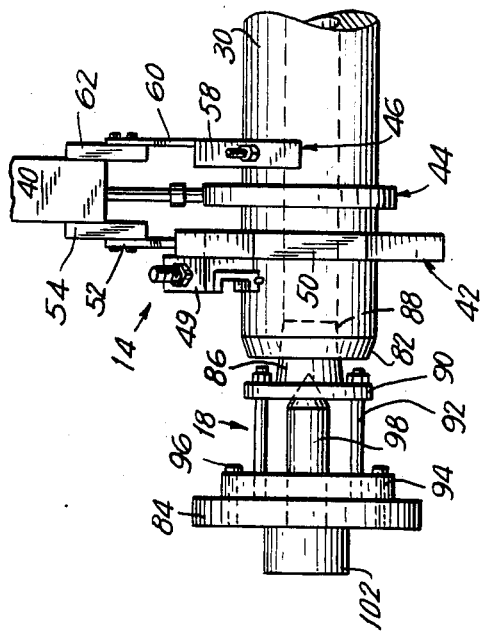
FIG. 4 is a side view of the headstock drive assembly and inductor head support assembly.
Figure 5:
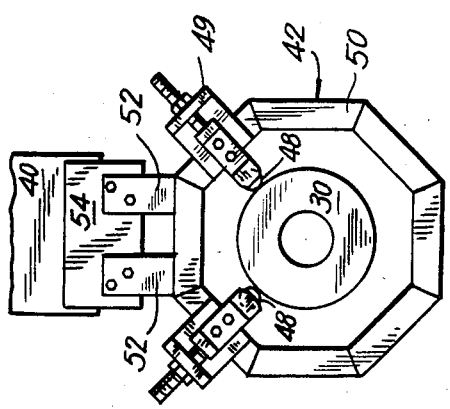
FIG. 5 is an end view of the roller guide.

Headstock drive assembly 18, shown in detail in FIG. 4, is constructed to allow the inductor coil 44 to run out over beveled end 82 of mandrel bar 30. Mandrel bar 30 is connected to the headstock face plate 84 by a pipe plug connector 86 screwed into a taper threaded hole 88 on the beveled end 82 of mandrel bar 30. A plug flange 90 is welded onto pipe plug connector 86. Plug flange 90 has four holes for tie bolts 92 to affix plug flange 90 to adapter plate 94. Adapter plate 94 is in turn affixed to headstock face plate 84 by bolts 96. A headstock center 98 is centered on the flanged end of pipe plug connector 86 and extends through plug flange 90, adapter plate 94, and headstock face plate 84. The headstock face plate 84 is connected to a motor drive 100 through connector 102. The plug flange 90 diameter is smaller than the mandrel bar 30 diameter to permit the roller guide 42 supporting the inductor coil 44 to run over the end of the plug flange 90 so that the beveled end 82 of bar 30 can be induction hardened.

EXAMPLE 1

A workpiece was forged from an ingot of H-11 steel having a final ladle chemistry as follows (in percent):

| C | Mn | P | S | Si | Ni | Cr | Mo | V |
|---|---|---|---|---|---|---|---|---|
| 0.35 | 0.30 | 0.013 | 0.004 | 1.03 | 0.20 | 4.82 | 1.49 | 0.43 |

The workpiece was about 6 feet, 9 inches (2057 mm.) and was stepped so that induction hardening could be carried out on different diameters (Section A=8.446 inches (214.5 mm.), Section B=6.911 inches (175.5 mm.), and Section C=5.060 inches (128.5 mm.)). The workpiece was given post forging treatment and was through hardened and had the following mechanical properties: average yield strength of 128,000 psi (90.0 Kg./mm.²), impact strength of 10 foot pounds (13.6 Joules), and Brinell hardness of 321 to 341.

The induction hardening apparatus of the present invention was used to case harden the workpiece. Power settings as listed in Table 1 were developed for all three diameters to achieve a surface temperature of about 1900° F. (1037.8° C.).

TABLE 1

POWER SETTINGS FOR INDUCTION HARDENING

| Diameter in Inches (mm.) | Coil Size in inches (mm.) | Power Potentiometer Pot | K.W.* | Amps* | Volts* | Frequency (Hz) |
|---|---|---|---|---|---|---|
| 5.060 (128.5) | 5½ (139.7) | 113 | 20 | 33 | 62 | 2923 |
| 6.911 (175.5) | 7⅜ (187.3) | 140 | 26 | 37 | 67 | 3041 |
| 8.446 (214.5) | 9 (228.6) | 185 | 35 | 48 | 79 | 2785 |

*Represents percentage of maximum machine capability.

A dwell time of five seconds was found to be adequate to maintain the 1900° F. (1037.8° C.) temperature before starting the inductor travel speed of about 4¾ in./min. (121 mm./min.). The workpiece was rotated at about 15 revolutions per minute and was allowed to air cool after being induction heated. A macro disc was sawed off from each diameter after double tempering at about 1010° F. (543.3° C.). A micro section was cut off from each macro section. Micro hardness as a function of distance from the outside diameter after double tempering is shown for each diameter in FIGS. 1(A–C) with values listed in Table 2. The steel so induction hardened yields a minimum hardness of 48 Rc (484 DPH) at a case depth of about 3/16 inch (4.76 mm.). The surface hardness is about 60 Rc.

TABLE 2

MICRO HARDNESS VS. DISTANCE FROM OUTSIDE DIAMETER AFTER INDUCTION HARDENING AND DOUBLE TEMPER

| Distance in Inches (mm.) | Micro Hardness (DPH - 100 Gram Load) | | |
|---|---|---|---|
| | Section A | Section B | Section C |
| 0.010 (0.254) | 661 | 651 | 615 |
| 0.020 (0.508) | 631 | 615 | 635 |
| 0.040 (1.016) | 612 | 630 | 612 |
| 0.080 (2.032) | 615 | 617 | 612 |
| 0.120 (3.048) | 612 | 600 | 587 |
| 0.160 (4.064) | 615 | 573 | 565 |
| 0.200 (5.080) | 558 | 537 | 533 |
| 0.240 (6.096) | 510 | 503 | 480 |
| 0.280 (7.112) | 470 | 315 | 422 |
| 0.320 (8.128) | 288 | 321 | 301 |
| 0.360 (9.144) | 315 | 341 | 325 |
| 0.400 (10.160) | 327 | 346 | 337 |

Having described the invention with particular reference to the preferred form thereof, it will be apparent to those skilled in the art to which the invention pertains, that various changes and modifications can be made therein without departing from the spirit and scope of the invention as defined by the claims appended hereto.

We claim:

1. A process for induction hardening through hardened chromium-molybdenum hot work die steel to achieve a uniform surface hardness and case depth without cracking or peeling through the case depth comprising the steps of induction heating to a uniform temperature about an upper critical temperature, cooling, and double tempering at temperatures below a lower critical temperature.

2. A process as claimed in claim 1 wherein the steel has been through hardened to 321 to 375 Brinell before induction hardening.

3. A process as claimed in claim 1 wherein the surface hardness of the steel is at least 60 Rc and case hardness is at least 48 Rc at about 3/16 inch (4.76 mm.) case depth after induction hardening.

4. A process as claimed in claim 1 wherein the steel is type H-11.

5. A process as claimed in claim 1 wherein the uniform temperature above the upper critical temperature is about 1900° F. (1037.8° C.).

6. A process as claimed in claim 1 wherein the cooling step is by air cooling.

7. A process as claimed in claim 1 wherein the double tempering temperatures below the lower critical temperature are both about 1010° F. (543.3° C.).

8. A process for induction hardening type H-11 steel through hardened to 321 to 341 Brinell to achieve a uniform surface hardness of at least 60 Rc and a case hardness of at least 48 Rc at about 3/16 inch (4.76 mm.) comprising the steps of heating by inductor coil to about 1900° F. (1037.8° C.) with an inductor coil travel speed of about 4¾ inches/min. (121 mm./min.) while rotating at about 15 revolutions per minute, air cooling, and double tempering at about 1010° F. (543.3° C.).

9. An apparatus for continuously induction heating a workpiece to obtain a hardened workpiece with minimum distortion, said apparatus comprising:
   a frame;
   a stationary bed supported by said frame;
   means for supporting a workpiece in said apparatus;
   a headstock drive assembly for engaging one end of a workpiece and rotating such workpiece;
   an inductor head support assembly adapted to be supported by a workpiece;
   a carriage assembly slidably supported on said stationary bed for moving said inductor head support assembly in a line of movement along a workpiece;
   counterweight means pivotably connected to said inductor head support assembly by at least one intermediate connecting means, with said intermediate connecting means being pivotably connected to said carriage assembly, whereby said counterweight means has a sufficient weight to cause said inductor support assembly to apply a minimum force on said workpiece supporting said inductor head support assembly;
   a drive means connected to said carriage assembly for driving said carriage assembly and inductor head support assembly along the longitudinal length of said workpiece; and
   at least one pivotable connection between said inductor head support assembly and said carriage assembly for allowing free movement of said inductor head support assembly in a plane perpendicular to the line of movement of said inductor head support assembly along a workpiece.

10. An apparatus as claimed in claim 9 wherein said inductor head support assembly comprises an inductor head, an inductor coil, a roller guide, and a shoe guide, wherein said inductor head supports said inductor coil, said roller guide, and said shoe guide, said inductor coil being supported between said roller guide and said shoe guide, and wherein said inductor coil surrounds a workpiece so that when such workpiece is held in said apparatus there is a uniform gap between said inductor coil and such workpiece.

11. An apparatus as claimed in claim 10 wherein said roller guide comprises a mounting bracket for supporting at least one ball bearing roller and said shoe guide comprises a mounting bracket and at least one shoe, said ball bearing roller and said shoe for contacting a workpiece, such workpiece having a cold side on one side of said inductor coil and a hot side on the other side of said inductor coil, said ball bearing roller contacting the cold side and said shoe contacting the hot side of such workpiece, said ball bearing roller and said shoe for adapting to distortions in such workpiece and moving said inductor head so that said inductor coil maintains a uniform gap around such workpiece.

12. An apparatus as claimed in claim 11 wherein said pivotable connection comprises at least one longitudinal arm rigidly mounted above said inductor head and at least one transverse arm pivotably connected to said carriage assembly, said longitudinal arm and said transverse arm pivotably connected to a connector plate.

13. An apparatus as claimed in claim 12 wherein said headstock drive assembly is adapted so that said roller guide and said inductor coil can run out over an end of a workpiece.

14. An apparatus as claimed in claim 13 wherein said means for supporting a workpiece in said apparatus comprises at least one steady rest mounted on said stationary bed, wherein said steady rest has rollers for supporting such workpiece, said rollers being removable to allow for passage of said inductor coil past said steady rest.

15. An apparatus as claimed in claim 12 wherein said means for supporting a workpiece in said apparatus comprises headstock and tailstock centers.

16. A process for continuously induction hardening a workpiece to obtain a hardened workpiece with minimum distortion, with said workpiece being a mandrel bar for a tube piercing mill made from class 520 steel, comprising scanning a workpiece with an inductor coil in one direction and adjusting the inductor coil in a plane perpendicular to the scanning direction of the inductor coil so a uniform gap is maintained between the workpiece and the inductor coil, with said workpiece being continuously heated by said inductor coil to a temperature above an upper critical temperature, air cooled, and double tempered to temperatures below a lower critical temperature.

17. A process as claimed in claim 16 wherein said mandrel bar has a surface hardness of 60 Rc and a case hardness of 48 Rc at about 3/16 inch (4.76 mm.) after induction hardening.

* * * * *

UNITED STATES PATENT AND TRADEMARK OFFICE
CERTIFICATE OF CORRECTION

PATENT NO. : 4,599,502

DATED : July 8, 1986

INVENTOR(S) : Ashok K. Khare

It is certified that error appears in the above-identified patent and that said Letters Patent is hereby corrected as shown below:

Column 5, line 53, "roller" should be --rollers--

Column 7, line 68, "about" should be --above--

Signed and Sealed this

Second Day of February, 1988

Attest:

DONALD J. QUIGG

Attesting Officer

Commissioner of Patents and Trademarks